United States Patent
Bhan et al.

(10) Patent No.: US 8,000,684 B1
(45) Date of Patent: Aug. 16, 2011

(54) MANAGING TRANSMISSION POWER FOR MESSAGE WAITING NOTIFICATION

(75) Inventors: Ashish Bhan, Shawnee, KS (US); Maulik K. Shah, Overland Park, KS (US); Jason P. Sigg, Olathe, KS (US); Jasinder P. Singh, Olathe, KS (US); Anil Singh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 678 days.

(21) Appl. No.: 12/115,226

(22) Filed: May 5, 2008

(51) Int. Cl.
*H04M 1/725* (2006.01)
(52) U.S. Cl. ............... 455/412.2; 455/412.1; 455/413
(58) Field of Classification Search .................. None
See application file for complete search history.

(56) References Cited

U.S. PATENT DOCUMENTS

| 6,088,589 | A | * | 7/2000 | Valentine et al. | 455/433 |
| 6,188,885 | B1 | * | 2/2001 | Kolev et al. | 455/413 |
| 2010/0128621 | A1 | * | 5/2010 | Hamabe et al. | 370/252 |

OTHER PUBLICATIONS

U.S. Appl. No. 11/772,466, filed Jul. 2, 2007 entitled "Dynamic Variation of Paging Power Based on Paging Slot Frequency".

* cited by examiner

*Primary Examiner* — Erika Gary

(57) ABSTRACT

Disclosed herein is a mechanism to help improve message waiting notification. In accordance with the mechanism, when a RAN transmits an MWI to a mobile station after unsuccessful call setup paging of the mobile station, the RAN will transmit the MWI at a higher power level than the RAN used for transmitting the call setup paging. Using a higher transmission power specifically for the MWI should help the MWI reach the mobile station, particularly in a scenario where a reason for call setup paging failure was noise on the air interface. Consequently, the disclosed mechanism should help improve user experience by increasing the likelihood that mobile stations will receive and process MWIs soon after the associated voice mail messages are left.

19 Claims, 4 Drawing Sheets

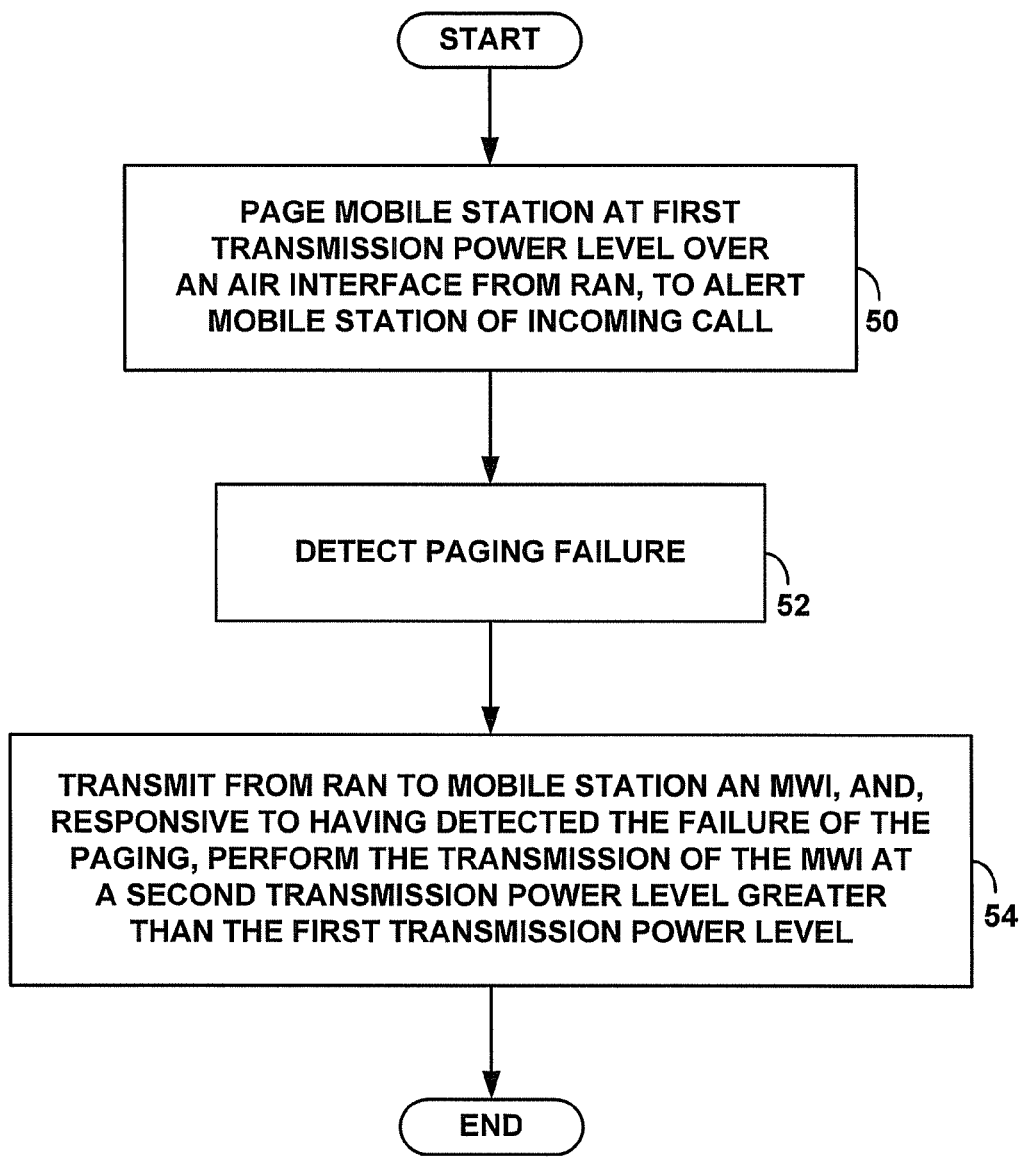

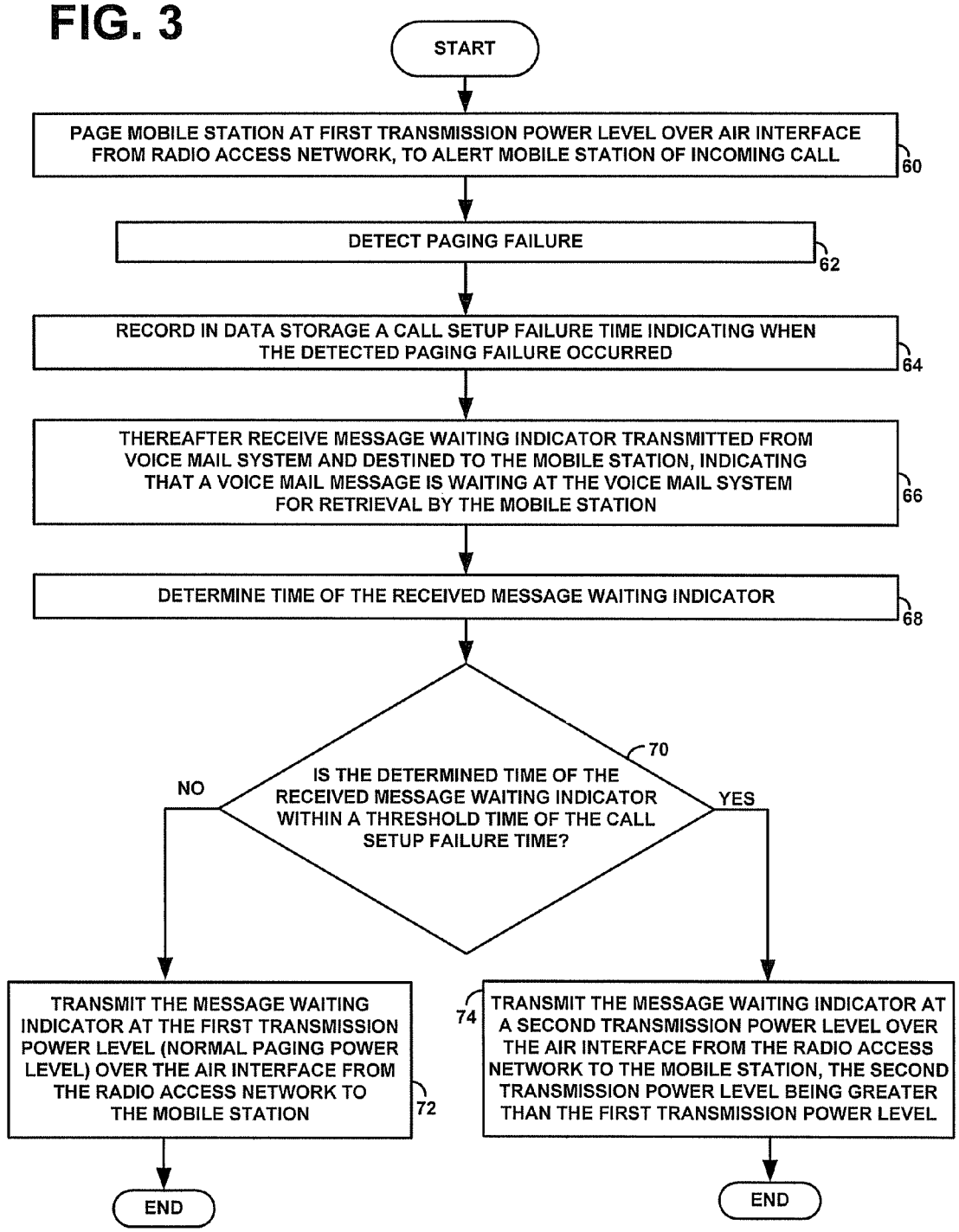

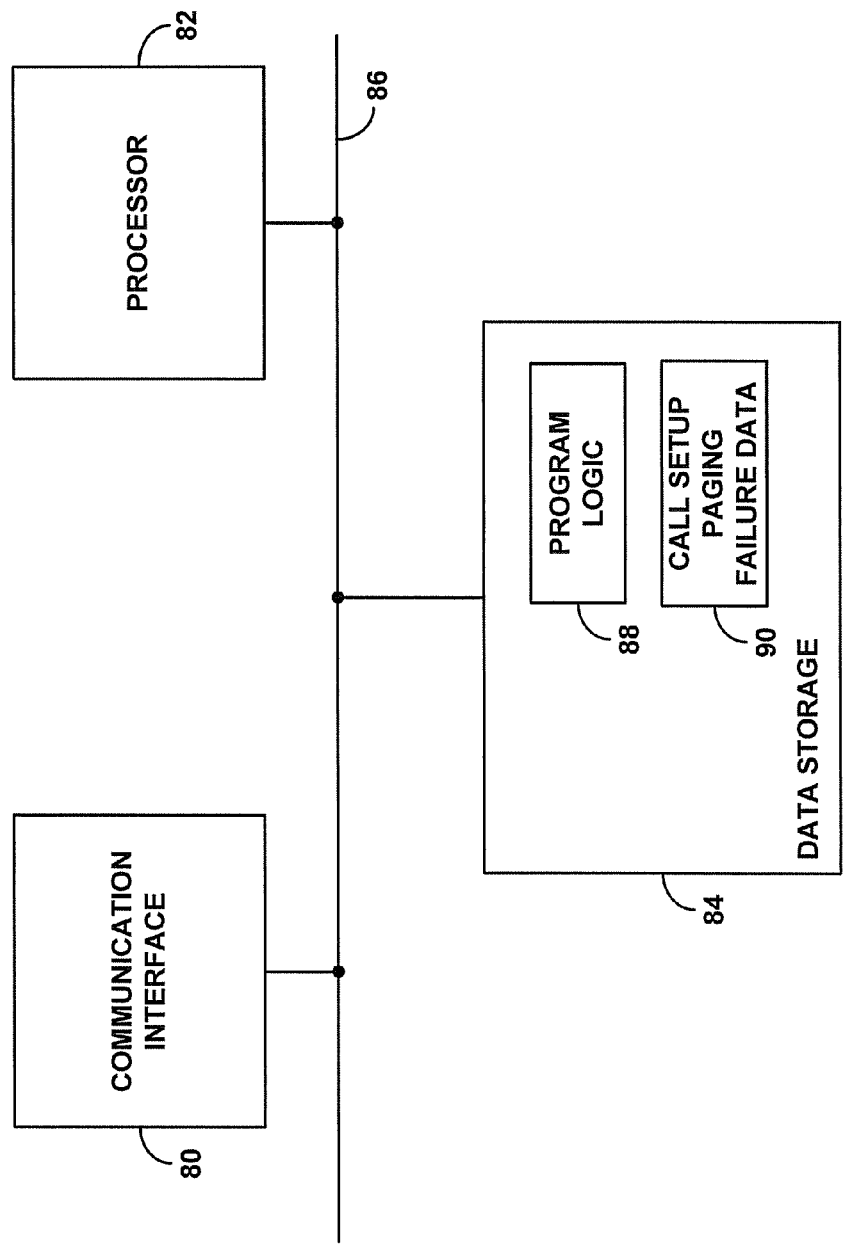

MANAGING TRANSMISSION POWER FOR MESSAGE WAITING NOTIFICATION

BACKGROUND

In a typical cellular wireless communication system, an area is divided geographically into a number of cell sites, each defined by a radio frequency (RF) radiation pattern from a respective base station. The base stations of the cells are then coupled to a switch or gateway (hereafter "switching system") that provides connectivity with a transport network and/or to a signaling network. When a mobile station (i.e., wireless communication device), such as a cellular telephone, personal digital assistant, pager, or appropriately equipped portable computer, for instance, is positioned in a cell, the mobile station may then communicate via an RF air interface with the base station of the cell. Consequently, a communication path can be established between the mobile station and the network, via the air interface, the base station and the switching system. In this way, the base station(s) and switching system work in combination to function as a radio access network (RAN), providing mobile stations with RF access to engage in network communications, such as telephone calls or Internet communications.

In general, the air interface used for communications from a base station to mobile stations (i.e., the forward link) may be divided into a number of channels, including traffic channels used to carry bearer traffic (e.g., voice or other user data) and control channels used to carry overhead messages. Depending on the wireless technology used, the air interface can be divided into these channels through code division multiplexing (with each channel defined by modulation with a specific code), time division multiplexing (with each channel defined as a segment of time), frequency division multiplexing (with each channel defined by modulation with a specific frequency), and/or some other mechanism.

By way of example, in traditional Code Division Multiple Access (CDMA) systems, the forward link may define up to 64 channels, each distinguished by a unique "Walsh code." The control channels include a pilot channel defined by Walsh code 0, a synch channel defined by Walsh code 32, and a number of paging channels defined by Walsh codes 1 through 7, as necessary. The traffic channels, in turn, are defined by the remaining Walsh codes (up to 62 in total). Further, in a CDMA system, each sector of a base station cell is distinguished by a PN offset, which defines a sector-specific part of a pseudo-random number. Communications between a base station and a mobile station on a given channel, in a given sector, and on a given carrier frequency, are encoded using the Walsh code of the channel and the PN offset of the sector and are then carried on the carrier frequency. A mobile station receiving such a communication can then extract particular channels from the air interface by employing a "rake receiver" that scans through air interface signals in search of a signals that are encoded with particular combinations of PN offset and Walsh code.

As another example, in systems operating according to the well known EV-DO protocol (as defined by industry standard IS-856 for instance), the forward link is divided into timeslots of 1.67 ms each, and each timeslot is further time division multiplexed to define various channels including a data channel and a control channel. The data channel is used to carry bearer data to a mobile station, and the control channel is used to carry control messages such as page messages for instance. In addition, as with legacy CDMA systems, each cell sector defined under IS-856 may have a respective PN offset and may operate on a particular carrier frequency, and so forward link communications may be encoded using the PN offset, modulated on the carrier frequency, and carried in a particular timeslot. Numerous other air interface protocols are known as well or will be developed in the future.

When a RAN receives a request to connect a call (e.g., a legacy voice call or VoIP call) to a mobile station, the RAN will typically page the mobile station in an effort to determine whether the mobile station is available to receive the call. In practice, for instance, the switching system may direct the serving base station to broadcast over an air interface paging channel a general page message directed to the mobile station. If the mobile station receives the page message, the mobile station would then respond with an acknowledgment message back to the RAN, which would cause the switching system to continue setup of the call to the mobile station. On the other hand, if the RAN does not receive an acknowledgement from the mobile station within a set period of time, the RAN may then re-page the mobile station. Further, the RAN may repeat the re-paging process a set number of times or until the RAN receives an acknowledgement from the mobile station. Ultimately, if the RAN does not receive any page-acknowledgement from the mobile station, the RAN may programmatically conclude that the call setup paging process failed. Consequently, the RAN may then responsively set up the call to a voice mail system, to allow the caller to leave a message for the called party.

Once the caller leaves a message at the voice mail system, the voice mail system will commonly send a message waiting indication (MWI) to the mobile station, to alert a user of the mobile station that a message is available for retrieval. In practice, the voice mail system may send the MWI as a data-over-signaling message to the RAN, in much the same way that network entities transfer short messaging system (SMS) messages from point to point. Upon receipt of the MWI at the RAN, the switching system may then direct the serving base station to transmit the MWI via the paging channel to the mobile station. Upon receipt of the MWI, the mobile station may then present a corresponding notification (e.g., an envelope icon, tone, vibration, etc.), to notify a user of the mobile station that a message is waiting to be retrieved.

Overview

The present disclosure stems from a realization that transmission of an MWI to a mobile station soon after call setup paging failure has occurred is itself likely to fail for largely the same reason that the call setup paging process failed. One reason for this failure may be poor RF coverage. In particular, RF problems such as excessive noise on the air interface may have prevented the mobile station from properly receiving the call setup page message(s) transmitted by the RAN. If the caller then leaves a message and the voice mail system promptly sends an MWI to the mobile station, transmission of the MWI on the paging channel would likely suffer from the same poor RF conditions and would therefore also be unlikely to arrive successfully at the mobile station. The consequence of this failure is that a user of the mobile station would not learn right away that a message has been left for the user. Network processes may trigger retransmission of the MWI at some later time, such as when the mobile station re-registers with the network. However, by that time, the message may be stale, and the user may perceive the message waiting indication to be unacceptably late.

Disclosed herein is a mechanism to help overcome this problem. In accordance with the mechanism, when a RAN transmits an MWI to a mobile station after unsuccessful call setup paging of the mobile station, the RAN will transmit the MWI at a higher power level than the RAN used for transmitting the call setup paging. Using a higher transmission power specifically for the MWI should help the MWI reach the mobile station, particularly in a scenario where a reason for call setup paging failure was noise on the air interface. Consequently, the disclosed mechanism should help improve user experience by increasing the likelihood that mobile stations will receive and process MWIs soon after voice mail messages are left.

These as well as other aspects, advantages and alternatives will become apparent to those of ordinary skill in the art by reading the following detailed description with reference where appropriate to the accompanying drawings.

BRIEF DESCRIPTION OF THE DRAWINGS

FIG. 2 is a flow chart depicting functions that can be carried out in accordance with the exemplary method.

FIG. 3 is another flow chart depicting functions that can be carried out in accordance with the exemplary method.

FIG. 4 is a block diagram depicting functional components that can be included in a system to implement the present method.

DETAILED DESCRIPTION

Figure 1:
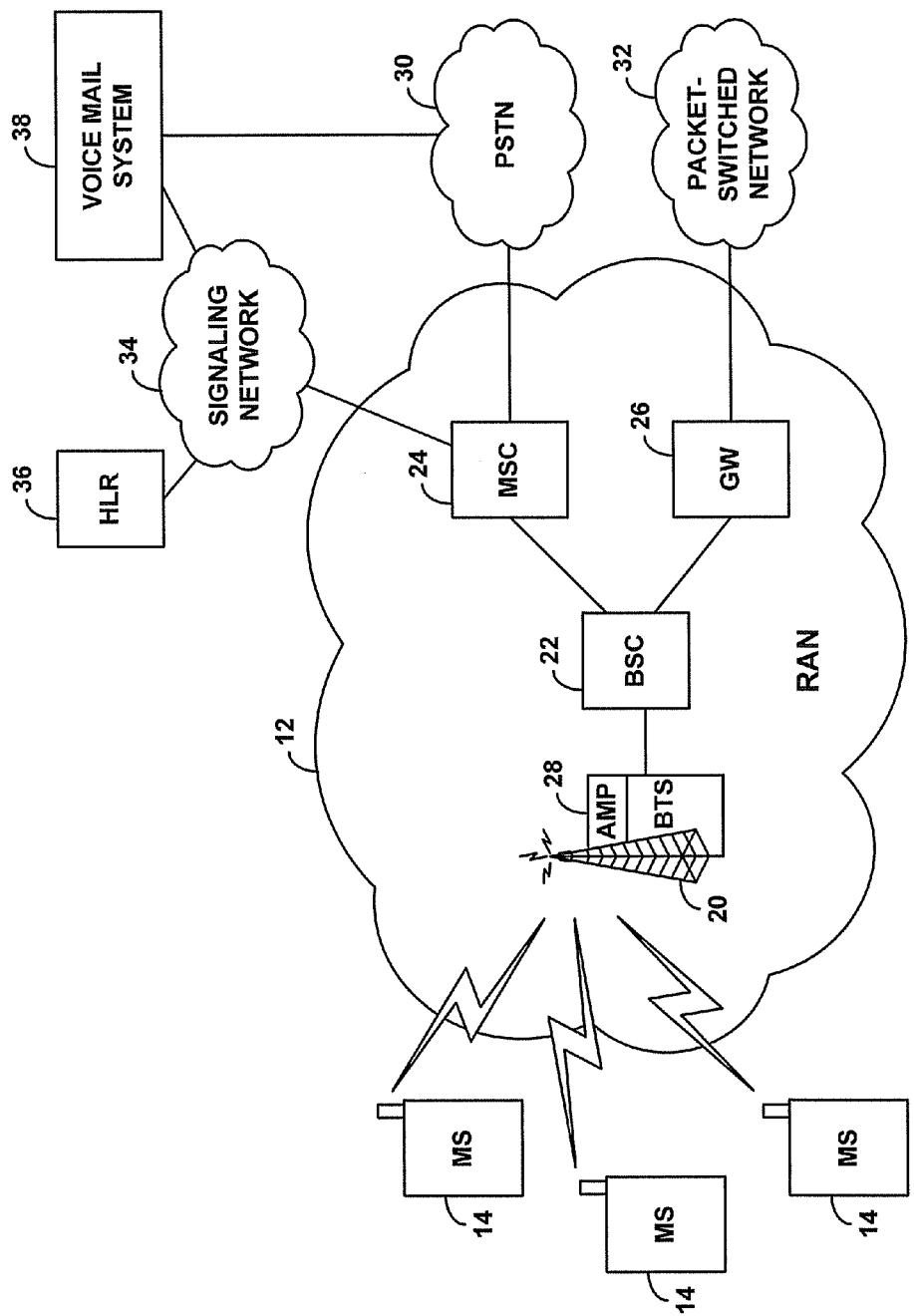
FIG. 1 is simplified block diagram of a communication system in which an exemplary method can be implemented.

Referring to the drawings, as noted above, FIG. 1 is a simplified block diagram of a communication system in which the exemplary method can be implemented. It should be understood, of course, that this and other arrangements and functions described herein (including in the summary section above) are provided by way of example only and that numerous variations may be possible. For instance, structural and functional elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions). Still further, the term "exemplary" as used herein should be understood to mean "serving as an example, instance, or illustration."

The system of FIG. 1 includes at its core a radio access network (RAN) 12 that is arranged to serve one or more mobile stations 14 via an air interface 16 (or multiple air interfaces 16). The system, including RAN 12, mobile stations 14, and air interface 16, may operate according to any wireless communication protocol now known or later developed, examples of which include without limitation CDMA (e.g., CDMA2000, EV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared.

Generally speaking, mobile stations 14 may be any wireless communication devices that are capable of wirelessly communicating with RAN 12 and, in particular, any wireless communication devices that are capable of receiving and processing paging channel messages, such as call setup page messages and MWIs, from RAN 12. Examples of such mobile stations 14 include cellular telephones, wirelessly-equipped PDAs, wirelessly equipped personal computers, and wirelessly equipped appliances or devices of other sorts, now known or later developed. Preferably, mobile stations 14 will be capable of engaging in voice calls and interactions with a voice mail system.

As is well understood in the art, the term "mobile station" designates any such wireless communication device, regardless of whether the device is currently or permanently situated in a fixed position (e.g., attached to a wall or desk), and regardless of whether the device is easily movable (e.g., handheld or pocket-sized) or battery-operated. Wireless communication devices are considered to be "mobile stations" because they can usually be operated at various locations within the coverage of a serving RAN.

RAN 12, in turn, may be any wireless serving network that is capable of communicating over an air interface with one or more mobile stations, such as a mobile stations 14 for instance, and particularly such a network that is capable of sending paging channel messages, such as call setup page messages and MWIs, to mobile stations. As such, the RAN will include one or more antennas, one or more transceivers, and associated control logic for engaging in air interface communication with mobile stations according to any agreed air interface protocol. Further, the RAN will preferably include a variable power amplifier that facilitates transmitting of air interface communications at desired power levels.

The RAN 12 may connect with one or more transport networks and signaling networks and may include logic to set up and carry communications between entities on the network(s) and served mobile stations. For instance, the RAN may include a network interface and program logic to receive a call setup message seeking to set up a call to a particular mobile station, and the RAN may responsively page the mobile station via the air interface 16 and ultimately set up a communication path over the air to the mobile station. Likewise, the RAN may respond to a request from the mobile station to place an outbound call to a particular entity, such as a voice mail system, and the RAN may set up the call to the particular entity. Further, the RAN may receive a data over signaling message, such as an SMS message or MWI, destined to a particular mobile station, and the RAN may transmit the message via an air interface paging channel to the mobile station. And the RAN may similarly receive a data over signaling message, such as an outbound SMS message or MWI acknowledgement, from the mobile station and transmit the message to a destination entity.

Without limitation, FIG. 1 depicts an example configuration of RAN 12. As shown, the example RAN includes a base station 20, a base station controller (BSC) 22, a mobile switching center (MSC) 24, and a packet data gateway (GW) 26. In other arrangements, it should be understood that the RAN may take different forms, ranging from a single element (e.g., a wireless access point router) to other more complex forms, with various different elements.

Base station 20 preferably includes an antenna tower (or other antenna structure) and associated equipment, including a programmable processor for instance, arranged to communicate over air interface 16 with one or more served mobile stations 14. The base station 20 antenna and associated equipment may be arranged to define a cell and various cell sectors in which mobile stations can operate. Further, the base station 20 preferably includes, possibly for each sector, a power amplifier 28 such as a tower-top amplifier for instance, which is arranged to amplify RF signals for transmission over air interface 16 to mobile stations. Preferably, the power amplifier 28 has a variable gain that can be set by an appropriate control signal or other logic. Variable gain power amplifiers are well known in the art and are therefore not described in detail here.

BSC 22 is coupled with and functions to control one or more base stations such as base station 20, so as to manage aspects of base station and air interface operation. For instance, BSC 22 may manage handoff of mobile stations moving between base station coverage areas, and to schedule air interface transmissions of data or other bearer or control traffic via base stations to or from various mobile stations. Further, BSC 22 may programmatically control the power of transmissions over the air interface, such as by directing base station 20 to increase or decrease the gain of its power amplifier or to set the gain at a specific level for instance. Depending on the wireless protocol used, aspects of the base station 20 and BSC 22 may be combined together or distributed in other ways, generally defining a base station system or more generally a "base station".

MSC 24, in turn, is coupled with and functions to control one or more BSCs, such as BSC 22 for instance. For instance, MSC 24 may manage handoff of mobile stations moving between BSC coverage areas, and to direct BSC 22 to take various actions such as paging particular mobile stations. In a RAN where an MSC is provided, the MSC may generally control operation of the RAN, including possibly controlling the power level of air interface transmissions by appropriately signaling to a serving mobile station or directing BSC 22 to effect such power control. Alternatively, the BSC (sometimes referred to as a radio network controller (RNC)) may generally control operation of the RAN.

As shown, the MSC 24 is conventionally connected with the public switched telephone network (PSTN) 30, so as to enable suitably equipped mobile stations (e.g., cellular telephones) to engage in telephone calls or other PSTN communications with entities on the PSTN.

In typical operation, when a call is placed to a mobile station, the MSC 24 would receive a communication that triggers paging of the mobile station. For instance, the MSC 24 may receive an Integrated Services Digital Network User Part (ISUP) Initial Address Message (IAM) or other communication that signifies the call and identifies the mobile station. The MSC 24 would then send a paging request to the BSC 22. In turn, the BSC would direct the base station 20 to send a page message over the air interface 16 in an effort to locate the called mobile station. If the mobile station is located the coverage area of the RAN and receives the page message, the mobile station may then send a page response message over the air to the RAN. Thereafter, the BSC 22 may direct the base station to send an acknowledgement message to the mobile station, and the BSC may then direct the base station to send to the mobile station a channel assignment message that contains identifying information for a traffic channel, and the MSC 24 may connect the call through to the mobile station.

GW 26, in turn, is conventionally connected with a packet-switched network 32, such as the Internet or a wireless carrier's core transport network for instance. GW 26 may function as a network access server such as a packet data serving node (PDSN), to provide connectivity between circuit-switched communications with mobile stations and packet-switched communications on network 32. Further or alternatively, GW 26 may function as a media gateway (MGW) and may carry out functions that would otherwise be carried out by MSC 24. GW 26 may also function as a Mobile-IP (MIP) foreign agent and/or home agent for mobile stations arranged to engage in MIP communication via network 36, in a manner well known in the art.

BSC 22 and GW 26 may work together to enable suitably equipped mobile stations 14 to engage in packet-data communications, such as voice over IP (VoIP) communications, on network 32. In practice, for instance, a mobile station may initially work with the RAN to establish packet-data connectivity in accordance with any agreed protocol. When packet-data is transmitted to a mobile station, GW 26 and/or BSC 22 may receive the data as communication that triggers paging of the mobile station. GW 26 may, for instance, pass the data along to BSC 22 and instruct the BSC to page the mobile station, and BSC 22 may then direct the base station 20 to send a page message over the air interface 16 in an effort to locate the mobile station. If the mobile station is located the coverage area of the RAN and receives the page message, the mobile station may then send a page response message (e.g., a connection request message) over the air to the RAN. Thereafter, the BSC 22 may direct the base station to send to the mobile station a traffic channel assignment message that contains identifying information for a traffic channel, and the BSC may transmit the packet data via that traffic channel to the mobile station.

Each of the components of RAN 12, including base station 20, BSC 22, MSC 24 and GW 26, preferably includes a processor (i.e., one or more processors), data storage, and program instructions stored in the data storage and executable by the processor to carry out various functions described herein. Alternatively or additionally, these or other RAN components may include other forms of logic, such as firmware and/or hardware logic, to carry out various functions described.

FIG. 1 depicts MSC 24 being coupled with a signaling network 34, through which MSC 24 can engage in various signaling communication, such as ISUP signaling to set up calls to or from served mobile stations. Shown coupled with signaling network 36 by way of example are then a home location register (HLR) 36 and a voice mail system (VMS) 38. Further, MSC 24 is shown coupled by a voice trunk 40 with the VMS 38.

HLR 36 conventionally maintains a subscriber profile for each mobile station and delivers the profile to the MSC serving the mobile station at various times, so that the MSC can apply service logic in line with the mobile station's subscription. The subscriber profile may, for instance, indicate that when MSC 24 tries and fails to set up a call to the mobile station, the MSC should instead setup the call to VMS 42, so that the caller can leave a message for a user of the mobile station. The subscriber profile may also include other service logic parameters. For instance, the profile may indicate whether a given mobile station is entitled to receive MWIs at increased transmission power in accordance with the present disclosure, and the RAN may condition use of increased MWI transmission power on the profile containing that indication.

The VMS 38, in turn, functions in a known manner to receive, store, and play out voice mail messages, to generate and transmit MWIs for stored voice mail messages, and to receive MWI acknowledgements. In practice, when RAN 12 tries and fails to set up a call to a mobile station, MSC 24 may engage in ISUP signaling or another form of signaling to set up the call instead to VMS 38, and the caller may leave a message at the VMS 38. In response, the VMS may then generate and transmit an MWI as a data-over-signaling message via signaling network 34 to MSC 24, for paging channel transmission of the MWI in turn to the mobile station. Preferably if when the mobile station receives the MWI, the mobile station will then respond with an MWI acknowledgement message, which would pass via the MSC and signaling network to the VMS 38. Further, in the event the VMS 38 does not receive the MWI acknowledgement, the VMS 38 may re-send the MWI, possibly attempting two or some other designated number of times. Ultimately, if the VMS 38 does not receive an MWI acknowledgement from the mobile station, the VMS 38 may wait until later to re-transmit the MWI as noted above, such as when the mobile station re-registers with the network.

Referring next to FIG. 2, a flow chart is provided to illustrate various functions that can be carried out in accordance with the exemplary method. As shown in FIG. 2, at block 50, the method involves paging a mobile station at a first transmission power level over an air interface from a RAN, to alert the mobile station of an incoming call for the mobile station. At block 52, the method then involves detecting failure of the paging. And at block 54, the method involves thereafter transmitting from the RAN to the mobile station an MWI, and, responsive to having detected the failure of the paging, performing the transmitting of the MWI at a second transmission power level greater than the first transmission power level.

These steps may all be carried out when the mobile station is idle, in that it does not currently have a traffic channel. In that state, the acts of paging and transmission of the MWI will preferably occur via an air interface paging channel. In an alternative embodiment, some or all of the steps may be carried out when the mobile station is active, in that it has an assigned traffic channel or traffic channel resources, yet the transmission of paging and MWI messages would preferably still occur via a paging channel or some other control channel.

The act of paging a mobile station at a first transmission power level may be a default function of the RAN, where the base station 22 generally transmits page messages at a particular transmission power level (the first transmission power level) on the paging channel. By way of example, assuming the power amplifier 28 of the base station has a maximum power level, the base station 20 may be set to transmit page messages at 7% of that maximum level, i.e., using 7% of its total available power.

The base station may be set by default to use the first transmission power level for transmitting page messages. Alternatively, the base station may be directed in a given instance to use the first transmission power level. For example, when the MSC 24 directs the base station to send a page message, the MSC may send the general page message to the base station and may include in a header parameter of the general page message a flag or other parameter to which the base station will programmatically respond by transmitting the page message at the first transmission power level. Or as another example, the MSC may engage in separate control signaling with the base station to direct the base station to transmit the page message at the first transmission power level.

As noted above, the RAN may try a designated number of times (such as three times) to page a mobile station before concluding that call setup paging failure has occurred. In practice, the RAN may conduct each page attempt at the first transmission power level. Alternatively, in an effort to increase the likelihood of paging success, the RAN may incrementally increase its transmission power for each page attempt, in which case the final (highest) transmission power used before concluding that call setup paging failure occurred would preferably be the "first transmission power level" in the exemplary process.

As noted above, the act of detecting failure of the paging process may involve determining that the RAN does not receive from the mobile station a response to the paging. In an arrangement where the paging consists of a single page message, this function may involve determining that the RAN has not received from the mobile station a response to the single page message, within a designated time period allotted for a response. Alternatively, in an arrangement where the paging consists of a series of page attempts, this function may involve determining that the RAN has not receives from the mobile station a response to any of the page attempts, also within a designated time period. To make this determination in a given instance, the MSC 24 may begin decrementing a timer upon sending or directing transmission of a page message (e.g., the final one of a series of attempts) and may programmatically conclude that paging has failed upon expiration of that timer.

The act of transmitting the MWI at the second transmission power in response to having detected the failure of paging may then be carried out in various ways and by one or more entities, such as MSC 24, BSC 22, and/or base station 20 for instance.

In a preferred implementation, for example, MSC 24 will keep records of call setup paging failures and will use the records as a basis to determine that an MWI is destined to a mobile station as to which the RAN recently experienced a call setup paging failure. In particular, when MSC 24 detects a call setup paging failure (after whatever number of attempts the MSC is programmed to treat as an overall failure), the MSC will record in data storage an identification of the target mobile station and the time of the call setup paging failure. This indication will be used later to facilitate determining whether to send an MWI at an increased power level. Further, the MSC could maintain just one such indication per mobile station, by overwriting or otherwise deleting any earlier indications for the same mobile station.

At some point after recording the occurrence of a call setup paging failure, the MSC 24 will then receive an MWI transmitted from VMS 38, as an indication that a message for the mobile station has been left at the VMS and is available for retrieval. The MWI may arrive at the MSC via signaling network 34, as a data-over-signaling message. Further, the MSC may determine that the incoming message is an MWI (as opposed to some other sort of data-over-signaling message) by analysis of some characteristic of the message, such as a header parameter that indicates the message is an MWI.

Upon receipt of the MWI, the MSC will determine the mobile station to which the MWI is destined, so that the MSC can then determine if any call setup paging failure record exists for that mobile station. In practice, the identifier of the destination mobile station may be included as a header parameter in or with the MWI, to facilitate routing of the MWI to the appropriate mobile station. Thus, the MSC may simply read the destination mobile station identifier from the header parameter. Alternatively, the destination mobile station may be indicated in some other way, whether directly or indirectly (e.g., requiring some sort of lookup to determine). Given an identification of the destination mobile station, the MSC may then refer to the call setup paging failure records to determine if a call setup paging record exists for the mobile station.

Further, upon receipt of the MWI (and possibly in response to determining that a call setup paging record exists for the destination mobile station), the MSC will determine a time of the MWI. The MWI time may be a current time (e.g., a time of receipt of the MWI by the MSC), a time of transmission of the MWI from the VMS (e.g., indicated by the VMS as a timestamp header parameter or in some other manner), or another indication of time of the MWI.

Given the MWI time and the time of the call setup paging failure indicated by the call setup paging failure record for the destination mobile station, the MSC will then determine if the MWI time is within a threshold time period since the call setup paging failure time, i.e., whether the call setup paging failure occurred recently enough that it may make sense to transmit the MWI with increased power. The threshold time period can be configurable. However, a reasonable threshold time period may be a period equal to the duration of a longest possible voice mail message plus a few seconds to allow for signaling delays. For instance, if the VMS allows messages up to four minutes in length, then the threshold time period could be set to be four minutes and three seconds or the like. Other examples are possible as well.

If the MSC thereby determines that the MWI time is within the threshold time period of the call setup paging failure time, then the MSC will cause the base station to transmit the MWI to the mobile station at the second transmission power level, i.e., at a power level higher than that used by the RAN to transmit call setup page messages (e.g., higher than the highest power level used by the RAN in transmitting a sequence of call setup page messages).

The MSC can direct the base station to increase the paging channel power in any of a variety of ways, similar to those discussed above. By way of example, the MSC can provide the BTS with a flag such as a header parameter added into the MWI, and the base station may be programmed to detect that flag as an indication that power should be increased (e.g., by a particular amount designated by the flag or header parameter, and/or to a particular level designated by the flag or header parameter) just for transmission of the particular MWI. As another example, the MSC can engage in separate control signaling with the base station to effect the MWI transmission power increase by a particular amount or to a particular level.

The extent of transmission power increase to reach the second transmission power level can be configured. By way of example, again assume the base station normally transmits page messages using 7% of its total available power. The MWI could then be transmitted at 12% of the total available power, or at some other increased power level that would tend to help the MWI reach the destination mobile station. Preferably, whatever power increase is applied for transmission of the MWI will be transitory, with paging channel power transmissions reverting to normal power levels (e.g., the first transmission power level) after transmission of the MWI.

As a further aspect of the method, however, the MSC may also be arranged to incrementally increase the transmission power for each additional MWI attempt in the event a first MWI transmission fails. To accomplish this, the MSC may monitor signaling messages such as MWI acknowledgements, returned by mobile stations, and the MSC may detect receipt of a new MWI for a mobile station that has not yet responded to a recently transmitted MWI. In response, the MSC may then cause the base station to transmit the new MWI to the mobile station at a further increased transmission power level. For instance, if the first MWI was transmitted at a second transmission power level (higher than the first transmission power level used for call setup paging), then the new MWI may be transmitted at a third transmission power level that is higher than the second transmission power level. By way of example, if call setup paging messages are normally transmitted at 7% of the total available power, then a first MWI may be transmitted at 10% of the total available power, a second MWI (sent in response to the lack of an acknowledgement) may be transmitted at 12% of the total available power, and a third MWI may then be transmitted at 14% of the total available power.

In the exemplary method, if the MSC determines that the MWI time is not within the threshold time period since the call setup paging failure, then the MSC may forego increasing the MWI transmission power, as a reasonable conclusion is that the MWI does not relate to the call setup paging failure.

Other mechanisms may be applied as well to determine whether an MWI is related to a recent call setup paging failure and should be subject to the increased transmission power of the present method. By way of example, both the call setup paging failure data (recorded by the MSC) and the MWI (sent by the VMS) could identify the call in a unique manner, such as with a GUID call identifier for instance. In that case, use of increased MWI transmission power could be conditioned on the message waiting indicator being associated with the same call that experienced a call setup paging failure, possibly in combination with consideration of the threshold time period since call setup paging failure as described above.

Referring next to FIG. 3, another flow chart is provided to depict functions that can be carried out, in combination, in accordance with the present method to provide message waiting notification. As shown in FIG. 3, at block 60, the method first involves paging a mobile station at a first transmission power level over an air interface from a radio access network, to alert the mobile station of an incoming call for the mobile station. At block 62, the method then involves detecting failure of the paging, including determining that the radio access network does not receive from the mobile station a response to the paging. At block 64, the method then involves recording in data storage in the radio access network a call setup failure time indicating when the detected failure of paging occurred.

Thereafter, at block 66, the method involves receiving into the radio access network a message waiting indicator transmitted from a voice mail system and destined for the mobile station, with the message waiting indicator indicating that a voice mail message is waiting at the voice mail system for retrieval by the mobile station. In turn, at block 68, the method involves determining a time of the received message waiting indicator. And at block 70, the method involves making a determination of whether the determined time of the received message waiting indicator is within a threshold time of the call setup failure time.

If the determination is that the determined time of the received message waiting indicator is not within the threshold time of the call setup failure time, then, at step 72, the method involves transmitting the message waiting indicator at the first transmission power level over the air interface from the radio access network to the mobile station. On the other hand, if the determination is that the determined time of the received message waiting indicator is within the threshold time of the call setup failure time, then, at step 74, the method involves transmitting the message waiting indicator at a second transmission power level over the air interface from the radio access network to the mobile station, the second transmission power level being greater than the first transmission power level.

Referring next to FIG. 4, a block diagram is provided, to illustrate some of the components that can be involved in carrying out the present method, so as to improve message waiting notification as described herein. The block diagram may, for instance, represent components of a mobile switching center such as MSC 24. However, it should be understood that various components may be distributed and provided elsewhere in or with respect to a radio access network or other wireless communication system.

The arrangement of FIG. 4 includes a communication interface 80, a processor 82, and data storage 84, all of which may be coupled together by a system bus, network, or other connection mechanism 86.

Generally, the communication interface 80 functions to facilitate communication via one or more paths with one or more remote entities. If the communication interface is at MSC 24, for instance, the communication interface may include a network interface module that enables MSC 24 to communicate on with BSC 22, PSTN 30, and signaling network 34 so as to send and receive communications in accordance with the method described herein. The communication interface may take other forms as well, and may located elsewhere as well.

Processor 82 may comprise one or more general purpose processors (e.g., INTEL microprocessors) and/or one or more special purpose processors (e.g., digital signal processors). And data storage 84 may comprise one or more volatile and/or non-volatile storage components, such as magnetic, optical, or organic storage.

As shown, data storage 84 preferably contains program logic 88, which is executable by processor 82 to carry out various functions described herein. For instance, the program logic may be executable to detect failure of paging a mobile station. Further, the program logic may be executable to make a determination of whether a time of a received message waiting indicator is within a threshold time since the detected failure of paging the mobile station. And still further, the program instructions may be executable to take action based on that determination. In particular, if the determination is that the time of the message waiting indicator is not within the threshold time since the detected failure of paging of the mobile station, then the program instructions may be executable to transmit the message waiting indicator at the first transmission power level over the air interface from the radio access network to the mobile station, such as by causing a base station to transmit the message waiting indicator at the first transmission power level. Whereas, if the determination is that the time of the message waiting indicator is within the threshold time since the detected failure of paging of the mobile station, then the program instructions may be executed to transmit the message waiting indicator at the second transmission power level over the air interface from the radio access network to the mobile station, such as by causing a base station to transmit the message waiting indicator at the second transmission power level.

Furthermore, data storage 84 contains or is arranged to contain call setup paging failure data 90. As described above, this data would track call setup paging failures, to facilitate determination that a MWI is associated with a recently failed call setup, such that the MWI should be transmitted at a higher power level to help improve the message waiting notification process.

An exemplary embodiment has been described above. Those skilled in the art will appreciate that numerous variations from the embodiment described are possible while remaining within the scope and spirit of the invention as claimed.

For example, although the foregoing description is focused mainly on operation with respect to voice mail messages, those of ordinary skill in the art will readily appreciate from reading the description that the same principles could be applied with respect to other types of messaging systems, such as video messaging systems, e-mail messaging systems, and other messaging systems now known or later developed.

As another example, although the foregoing description is focused mainly on an MSC implementing functions of the method, those of ordinary skill in the art will readily appreciate that other entities could carry out the functions. For instance, the functions could instead be implemented by a base station itself.

Other examples are possible as well.

We claim:

1. A method for message waiting notification comprising:
    paging a mobile station at a first transmission power level over an air interface from a radio access network, to alert the mobile station of an incoming call for the mobile station;
    detecting failure of the paging;
    maintaining in data storage at the radio access network a set of data that identifies the mobile station and that specifies a failure-time indicative of when the failure of the paging occurred;
    receiving a message waiting indicator into the radio access network from a messaging system, for transmission of the message waiting indicator via the air interface from the radio access network to the mobile station, the message waiting indicator having a message waiting indicator time;
    thereafter transmitting from the radio access network to the mobile station a message waiting indicator, and, responsive to having detected the failure of the paging, performing the transmitting of the message waiting indicator at a second transmission power level greater than the first transmission power level; and
    conditioning the performing of the transmitting at the second transmission power level on a determination that a message waiting indicator time is within a threshold time of the failure-time.

2. The method of claim 1, wherein detecting the failure of the paging comprises determining that the radio access network does not receive from the mobile station a response to the paging.

3. The method of claim 1, wherein conditioning the performing of the transmitting at the second transmission power level on a determination that the message waiting indicator time is within a threshold time of the failure-time comprises:
    upon receipt of the message waiting indictor at the radio access network, determining the message waiting indicator time; and
    comparing the determined message waiting indicator time with the failure-time to determine that no more than the threshold time has passed since the paging failure, and responsively performing the transmitting of the message waiting indicator at the second transmission power level.

4. The method of claim 1, wherein the radio access network comprises a mobile switching center, and wherein maintaining the set of data in data storage at the radio access network comprises the mobile switching center maintaining the set of data.

5. The method of claim 4,
    wherein paging the mobile station at the first transmission power level over the air interface from a radio access network comprises the mobile switching center directing a base station of the radio access network to page the mobile station, wherein the base station responsively conducts the paging at the first transmission power level,
    wherein detecting failure of the paging comprises the mobile switching center detecting that the mobile switching center does not receive from the mobile station a response to the paging, and
    wherein transmitting from the radio access network to the mobile station a message waiting indicator at the second transmission power level comprises the mobile switching center sending the received message waiting indicator to the base station for transmission of the message waiting indicator by the base station to the mobile station, and the mobile switching center directing the base station to transmit the message waiting indicator at the second transmission power level.

6. The method of claim 5, wherein directing the base station to transmit the message waiting indicator at the second transmission power level comprises including with the message waiting indicator sent to the base station a directive for the base station to transmit the message waiting indicator at the second transmission power level, wherein the base station responds to the directive by transmitting the message waiting indicator at the second transmission power level.

7. The method of claim 6, wherein including with the message waiting indicator sent to the base station a directive for the base station to transmit the message waiting indicator at the second transmission power level comprises adding the directive into a header of the message waiting indicator, so that the base station receives the directive when the base station receives the message waiting indicator.

8. The method of claim 1, further comprising:
detecting failure of message waiting indication and responsively transmitting a next message waiting indicator at a third transmission power level higher than the second transmission power level.

9. The method of claim 1, wherein paging the mobile station at the first transmission power level over the air interface from the radio access network comprises the radio access network engaging in multiple page attempts for the incoming call, each page attempt being performed at the first transmission power level.

10. The method of claim 1, wherein when the radio access network engages in multiple page attempts for the incoming call, and wherein paging the mobile station at the first transmission power level over the air interface from the radio access network comprises performing a final page attempt for the call at the first transmission power.

11. The method of claim 1, wherein the message waiting indicator is a data over signaling message sent from a voice mail system and indicates a voice mail message waiting for a user of the mobile station.

12. The method of claim 1, further comprising carrying out the method while the mobile station is in an idle mode such that the mobile station does not have an air interface traffic channel, wherein the paging and transmission of the message waiting indicator occur over one or more air interface paging channels.

13. The method of claim 12, wherein air interface communications between the radio access network and the mobile station occur in accordance with a Code Division Multiple Access (CDMA) protocol.

14. A method for message waiting notification comprising:
paging a mobile station at a first transmission power level over an air interface from a radio access network, to alert the mobile station of an incoming call for the mobile station;
detecting failure of the paging, wherein detecting failure of the paging comprises determining that the radio access network does not receive from the mobile station a response to the paging;
recording in data storage in the radio access network a call setup failure time indicating when the detected failure of paging occurred;
thereafter receiving into the radio access network a message waiting indicator transmitted from a voice mail system and destined for the mobile station, the message waiting indicator indicating that a voice mail message is waiting at the voice mail system for retrieval by the mobile station;
determining a time of the received message waiting indicator;
making a determination of whether the determined time of the received message waiting indicator is within a threshold time of the call setup failure time;
if the determination is that the determined time of the received message waiting indicator is not within the threshold time of the call setup failure time, then transmitting the message waiting indicator at the first transmission power level over the air interface from the radio access network to the mobile station; and
if the determination is that the determined time of the received message waiting indicator is within the threshold time of the call setup failure time, then transmitting the message waiting indicator at a second transmission power level over the air interface from the radio access network to the mobile station, the second transmission power level being greater than the first transmission power level.

15. The method of claim 14, wherein the radio access network comprises a mobile switching center and a base station, wherein the mobile switching center makes the determination of whether the determined time of the received message waiting indicator is within the threshold time of the call setup failure time, and wherein the base station transmits the message waiting indicator over the air interface at the first transmission power level or the second transmission power level depending on the determination.

16. In a radio access network comprising a mobile switching center and a base station, wherein the base station has a power amplifier with variable gain for engaging in air interface transmissions at various power levels, wherein, when the radio access network receives a request to set up a call to a mobile station, the radio access network pages the mobile station over an air interface at a first transmission power level from the radio access network to the mobile station, the improvement comprising:
a processor;
data storage; and
program logic stored in the data storage and executable by the processor to carry out functions comprising: (i) detecting failure of paging the mobile station, (ii) thereafter receiving a message waiting indicator to be transmitted to the mobile station, (iii) making a determination of whether a time of the message waiting indicator is within a threshold time since the detected failure of paging the mobile station, (iv) if the determination is that the time of the message waiting indicator is not within the threshold time since the detected failure of paging of the mobile station, then transmitting the message waiting indicator at the first transmission power level over the air interface from the radio access network to the mobile station, and (v) if the determination is that the time of the message waiting indicator is within the threshold time since the detected failure of paging of the mobile station, then transmitting the message waiting indicator at the second transmission power level over the air interface from the radio access network to the mobile station, wherein the second transmission power level is greater than the first transmission power level.

17. The improvement of claim 16, wherein the program logic and data storage reside at the mobile switching center of the radio access network, wherein the mobile switching center stores call setup paging failure data within the data storage, wherein making the determination comprises the mobile switching center referring to the call setup paging failure data, and wherein transmitting the message waiting indicator comprises the mobile switching center causing the base station to transmit the message waiting indicator.

18. The improvement of claim 16, wherein the call to the mobile station is from a caller, wherein the message waiting indicator indicates a voice mail message left by the caller, and wherein receiving the message waiting indicator comprises receiving the message waiting indicator transmitted from a voice mail system after the caller has left a message at the voice mail system following the failure of paging the mobile station.

19. The improvement of claim 16, wherein the program logic is further executable by the processor to detect failure of message waiting indication after having transmitted the message waiting indicator to the mobile station at the second transmission power level, and to responsively transmit a next message waiting indicator to the mobile station at a third transmission power level higher than the second transmission power level.

* * * * *